Patented July 20, 1948

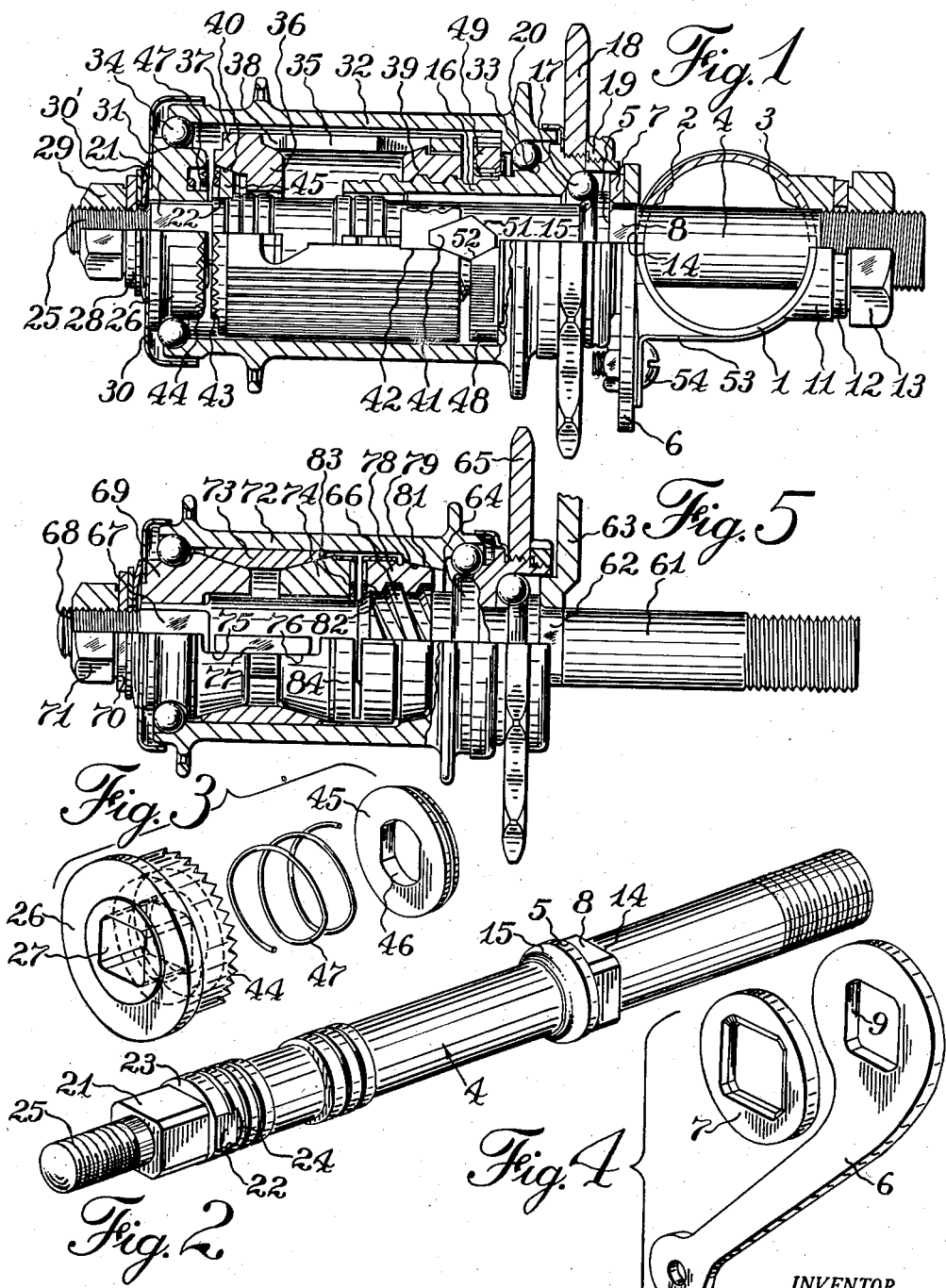

2,445,616

UNITED STATES PATENT OFFICE 2,445,616

VEHICLE BRAKE

E. Elliott Hood, Elmira, N. Y., assignor to Bendix Aviation Corporation, a corporation of Delaware Application March 29, 1946, Serial No. 658,293

6 Claims. (Cl. 192—6)

1

The present invention relates to vehicle brakes and more particularly to coaster brakes for bicycles, velocipedes and the like.

It is an object of the present invention to provide a novel coaster brake which is provided with a cantilever mounting arrangement in the frame of the vehicle on which it is used.

It is a further object to provide such a brake which is so arranged that the support for the wheel, the driving and controlling member, and the anchoring means are all located on one side of the vehicle wheel whereby the tire may readily be removed from the wheel while it is mounted in the frame, and the wheel may be taken off the axle without detaching the axle and its anchoring means from the frame.

Further objects and advantages will be apparent from the following description taken in connection with the accompanying drawing, in which:

Fig. 1 is a side elevation partly broken away and in section of a preferred embodiment of the invention;

Fig. 2 is a detail in perspective of the axle for the brake illustrated in Fig. 1;

Fig. 3 is a detail in perspective of the anchor member for transmitting braking torque from the brake to the axle, together with the retarding means for the brake sleeve, shown in disassembled relation;

Fig. 4 is a detail in perspective of the torque arm for connecting the axle to the frame of the vehicle to transmit the braking torque from the axle;

Fig. 5 is a view similar to Fig. 1 of a second embodiment of the invention.

In Fig. 1 of the drawing there is illustrated a tubular member 1 which constitutes a portion of the frame of a vehicle such as a bicycle. The frame member 1 is provided with transverse openings 2 and 3 for reception of an axle 4. The axle is formed with a shoulder 5 against which a torque arm 6 is seated, preferably with the interposition of a spacer 7. That portion of the axle adjacent shoulder 5 is square in cross section as indicated at 8, and the opening 9 in the torque arm 6 conforms thereto in order to prevent relative rotation. Means for clamping the axle in the frame member 1 is provided comprising a spacing member 11, washer 12, and nut 13 which compress the frame member against the torque arm 6 and the shoulder 14 formed on the axle by the termination of the squared portion 8.

The shoulder 5 of the axle is formed as a bearing cone 15, and a driving and control member in the form of a hollow screw shaft 16 is journalled thereon by means of bearing balls 17. This member has a driving sprocket 18 suitably fixed thereon at one end as indicated at 19, and has a bearing cone 20 formed adjacent thereto.

The free end of the axle 4 is reduced in diameter and formed with a portion having a square cross section as shown at 21. The shaft is also provided with oppositely arranged flats adjacent the squared portion so as to form a "double-D" section 22. The termination of the square section provides opposite shoulders 23 on the axle and the termination of the double-D section provides shoulders 24 axially spaced therefrom. The outer extremity of the axle is still further reduced in diameter and threaded as shown at 25.

An anchor member 26 having a square opening 27 is nonrotatably mounted on the squared portion 21 of the axle and retained thereon by means of a bearing adjuster 28 and lock nut 29 threaded on the portion 25 of the axle. The anchor member 26 is provided with a bearing cone 31, and a hub member 32 is journalled at its ends on the driving member 16 and anchor member 26 by means of bearing balls 33 and 34 respectively. By this arrangement, all three sets of bearings 17, 33 and 34 may be simultaneously adjusted by the bearing adjuster 28, and the adjustment fixed by lock nut 29. A dust cap 30 is preferably arranged to seat on the anchor member 26 and extend over the end of the hub 32, a spring washer 30' being mounted on the axle 4 adjacent thereto to hold the dust cap on its seat.

An expansible brake sleeve 35 is loosely mounted within the hub, one end thereof being supported by an expander member 36 slidably journalled on the axle and provided with wedge shaped lugs 37 extending into tapered slots 38 in the brake sleeve, while the opposite end of the brake sleeve is supported by a second expander member 39 which is threaded on the screw shaft 16 and is similarly provided with wedge shaped projections 41 engaging in slots 42 in the brake sleeve. The expander member 36 is provided with teeth 43 adapted to engage similar teeth 44 formed in the anchor member 26. The interior of the expander member 36 is formed with a tapered opening 40 for the reception of a retarder disc 45 having a similarly tapered periphery. Said retarder disc has a central opening 46 of double-D shape adapted to seat on the double-D portion 22 of the axle so as to be slidably but nonrotatably mounted thereon. A spring 47 is intersposed between the anchor member 26 and the retarder 45, urging the retarder toward the shoulder 24 on the axle and normally maintaining the teeth 43, 44 out of engagement.

Clutch means for connecting the hub 32 to the driving member 16 are provided in the form of a pair of arcuate clutch shoes 48, 49 loosely mounted in the hub 32 and conforming to the interior surface thereof. The wedge shaped projections 41 of expander member 39 are provided with tapered surfaces 51 arranged to engage similar surfaces 52 formed on the ends of the clutch shoes so that longitudinal movement of the expander member 39 to the right in Fig. 1 will expand the clutch shoes into engagement with the interior of the hub and thus form a positive driving connection to the hub.

In the operation of this embodiment of the invention, forward rotation of the sprocket 18 by the operator causes the driving member 16 to rotate in the direction to move the expander member 39 to the right, thus engaging the driving clutch 48, 49 with the interior of the hub 32, causing the hub to rotate with the sprocket. When the operator stops rotating the sprocket 18, the further rotation of the hub 32 by the momentum of the vehicle causes the expander member 39 to overrun the screw shaft and thereby move to the left sufficiently to release the driving clutch 48, 49. Thereafter the hub 32 is disconnected from the driving mechanism and rotates freely. If the operator rotates the sprocket 18 backwardly, traversal of the expander member 39 to the left proceeds until the expander member 36 engages the anchor member 26 and is locked thereto by the teeth 43, 44. Further backward motion of the sprocket 18 causes the expander 39 to move toward the expander 36 within the brake sleeve 35, thus wedging the latter into frictional engagement with the interior of the hub and thereby retarding its rotation with a force dependent on the pressure applied to the sprocket 18. Rotation of the brake assembly 35, 36, 39 during its traversal is frictionally opposed by the engagement of the retarder disc 45 within the expander 36, whereby such traversal on rotation of the screw shaft 16 is assured.

The braking torque which is exerted on the brake sleeve 35 by the rotating hub is transmitted through the expander member 36 and teeth 43—44 to the anchor member 26 and from thence to the squared portion 21 of the axle. This torque is transmitted from the axle to the frame member 1 of the vehicle by means of the torque arm 6 mounted on the squared portion 8 of the axle, the outer end of the torque arm 6 being clamped to the frame member in any suitable manner as by means of a clip 53 which embraces the frame 1 and is attached to the torque arm 6 by a bolt 54.

In the embodiment of the invention illustrated in Fig. 5, the same general principles of transmission of braking torque through the axle are utilized. As there shown an axle 61 is provided with a squared portion 62 for reception of a torque arm 63 having an opening conforming thereto. A driving member 64 is journalled on the axle adjacent the squared portion 62 and has a sprocket 65 rigidly mounted on one end, the other end being reduced and threaded as shown at 66.

The outer end of the axle 61 has a squared portion 67, and a threaded portion 68. A combined anchor and expander member 69 is non-rotatably mounted on the squared portion 67 of the axle, being maintained thereon by a bearing adjuster 70 and lock nut 71 threaded on the end of the axle.

A hub 72 is journalled on the driving member 64 and anchor member 69 and a brake element in the form of two substantially semi-cylindrical brake shoes 73 is loosely mounted in the hub, resting at one end on the anchoring expander member 69 and at the other end on a second expander member 74 which is loosely journalled on the axle 61. The bearing surfaces of the brake shoes 73 and expander members 69, 74 are tapered, whereby movement of the expander members toward each other causes the brake shoes to be wedged into engagement with the interior of the hub.

The adjacent portions of the expander members 69, 74 are provided with longitudinal recesses 75, 76 adapted to receive a pair of key members 77 which are longitudinally slidable in said recesses so as to spline the expander members together and prevent rotation of the brake shoes relative thereto.

A clutch nut 78 is threaded on the driving member 64, and provided with a tapered clutch surface 79 adapted to engage a mating surface 81 in the interior of the hub 72. Nut 78 is also provided with teeth 82 adapted to engage similar teeth 83 formed on the expander member 74, and relative rotation between these two members is frictionally resisted by a spring retarder 84 fixed in any suitable way on the nut 78 and bearing frictionally on the expander 74.

In the operation of this embodiment of the invention, forward rotation of the sprocket 65 and driving member 64 draws the clutch nut 78 to the right into clutching engagement with the interior of the hub so as to lock the hub thereto for rotation in unison. When the rotation of the driving member is stopped, the further rotation of hub 72 causes the clutch nut 78 to release, while backward rotation of the driving member causes the clutch nut to traverse to the left into clutching engagement with the expander member 74, after which the member 74 is pressed toward the anchor-expander member 69 within the brake shoes 73, thus expanding said shoes into frictional engagement with the hub.

Since keys 77 are interposed between the brake shoes 73, the braking torque is transmitted from said shoes through the keys to the anchor member 69, from the latter to the squared portion 67 of the axle 61, and from the other squared portion 62 of the axle to the frame of the vehicle by means of the torque arm 63.

Although but two embodiments of the invention have been shown and described in detail it will be understood that other embodiments are possible and various changes may be made in the design and arrangement of the parts without departing from the spirit of the invention as defined in the claims appended hereto.

What is claimed is:

1. A cantilever-mounted coaster brake for bicycles and the like including an axle fixedly mounted at one end in the frame of the vehicle, said mounting constituting the sole support of the frame thereon, a driving member journalled on the axle adjacent its mount, an anchor member non-rotatably mounted on the axle adjacent its free end, a wheel hub journalled on the anchor and driving members, brake mechanism for frictionally connecting the hub to the anchor member, means for applying the brake responsive to backward rotation of the driving member and a torque arm non-rotatably connected to the axle for transmitting braking torque from the axle to the vehicle frame.

2. A coaster brake as set forth in claim 1 including further, clutch means responsive to forward rotation of the driving member for connecting the driving member to the wheel hub, said driving member being interposed between the clutch means and the torque arm.

3. A cantilever-mounted coaster brake for bicycles and the like including an axle fixedly mounted at one end in the frame of the vehicle, a driving member journalled on the axle adjacent its mount, a stationary anchor member fixed on the axle adjacent its free end, a wheel hub journalled on the driving member and anchor member, an expansible brake sleeve loosely mounted in the wheel hub, and means responsive to backward rotation of the driving member for non-rotatably connecting the brake sleeve to the anchor member and thereafter expanding the brake into frictional contact with the interior of the hub.

4. A coaster brake as set forth in claim 3 including further a torque arm non-rotatably mounted on the axle adjacent the driving member for transmitting the braking torque from the axle to the vehicle frame.

5. A side-mounted coaster brake for bicycles and the like including an axle, means for rigidly mounting one end of the axle in a vehicle frame, said mount constituting the sole support of the frame on the axle, the axle having a non-circular portion adjacent its free end, an anchor member fixedly mounted on said non-circular portion, a torque arm preventing rotation of the axle in its mount, a driving member journalled on the axle adjacent the torque arm, a wheel hub journalled on the anchor and driving members, an expansible brake sleeve in the hub, a supporting and expanding member therefor threaded on the driving member, a second supporting and expanding member for the sleeve journalled on the axle and movable into clutching engagement with the anchor member; and a retarder for the second expanding member splined on the axle adjacent the anchor member and having frictional engagement with the second expander member.

6. A coaster brake as set forth in claim 5 including further a driving clutch adapted to engage the interior of the hub and transmit rotation thereto, the brake expanding member which is threaded on the driving member being arranged to engage the driving clutch responsive to forward rotation of the driving member.

E. ELLIOTT HOOD.

REFERENCES CITED

The following references are of record in the file of this patent:

UNITED STATES PATENTS

| Number | Name | Date |
|---|---|---|
| 402,313 | Duryea | Apr. 30, 1889 |
| 582,600 | Bullard | May 11, 1897 |
| 610,696 | Williams | Sept. 13, 1898 |
| 2,286,986 | Hood | June 16, 1942 |
| 2,314,845 | Kurzina | Mar 23, 1943 |
| 2,410,785 | Hood | Nov. 5, 1946 |